Oct. 6, 1970   R. J. PATRICK   3,531,826
METHOD AND APPARATUS FOR AGGLOMERATING PULVERULENT MATERIALS
Filed Aug. 24, 1967   2 Sheets-Sheet 1
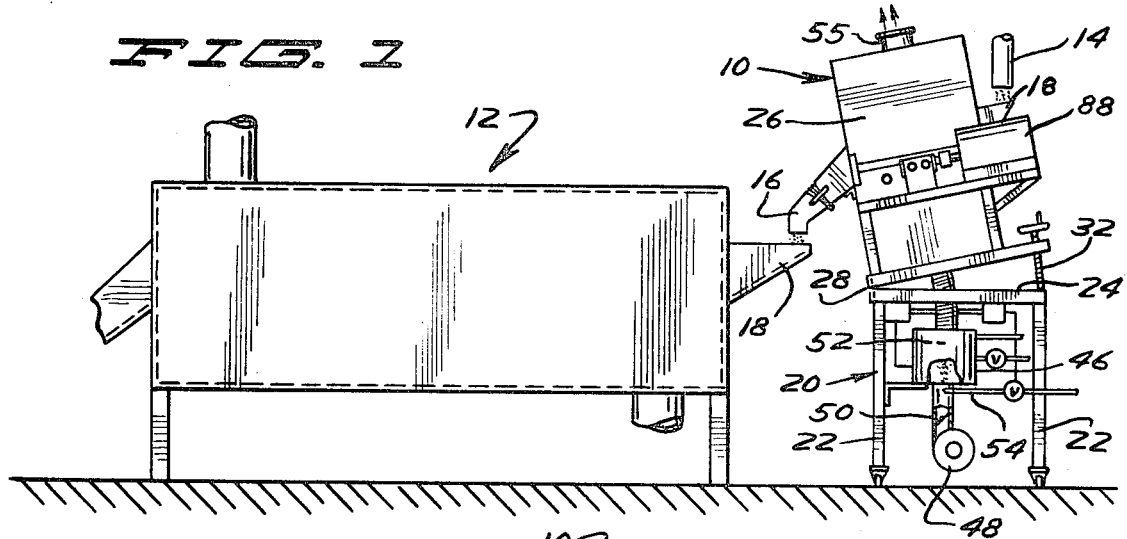
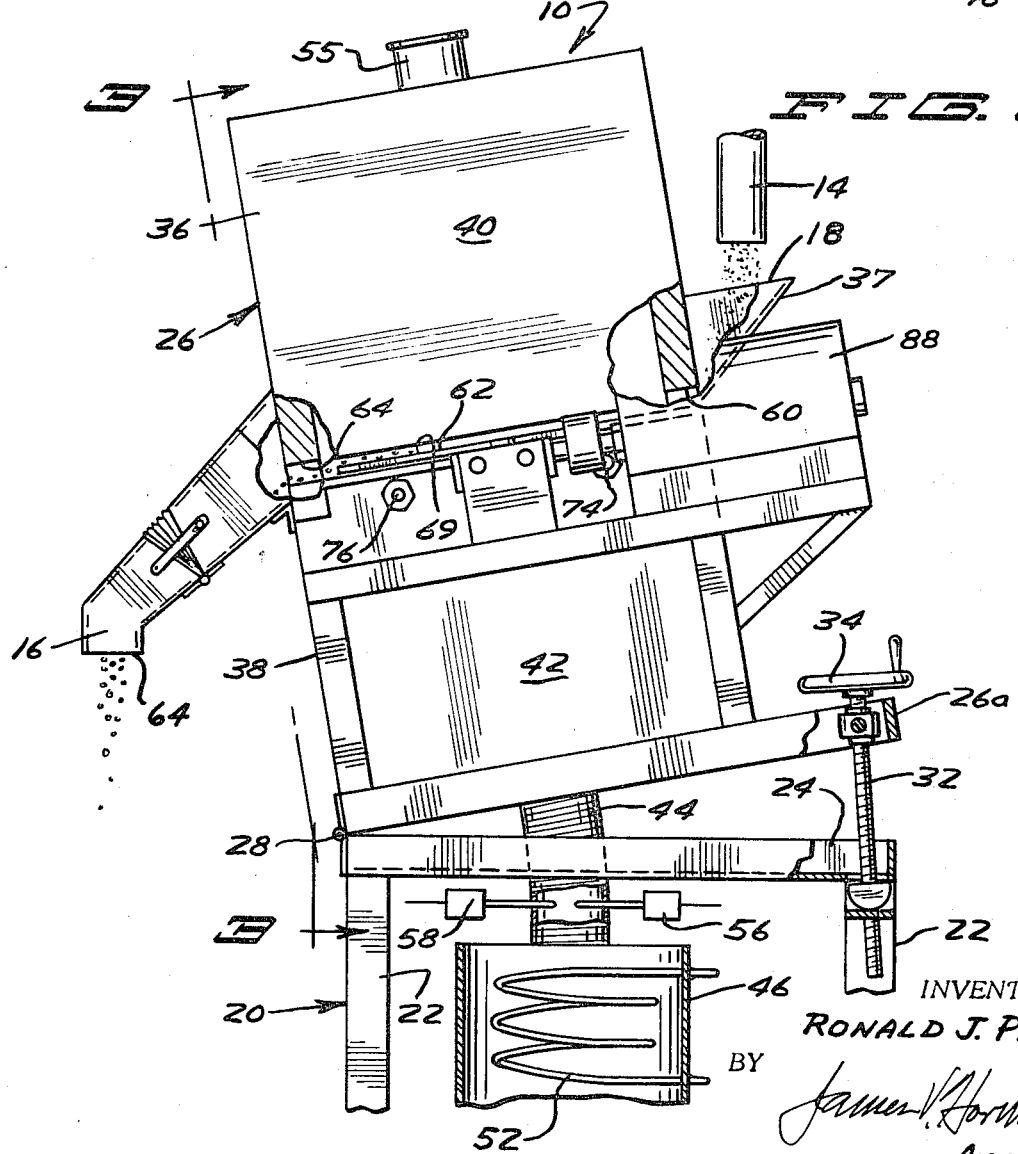
INVENTOR.
RONALD J. PATRICK
BY
James V. Horman
ATTORNEY

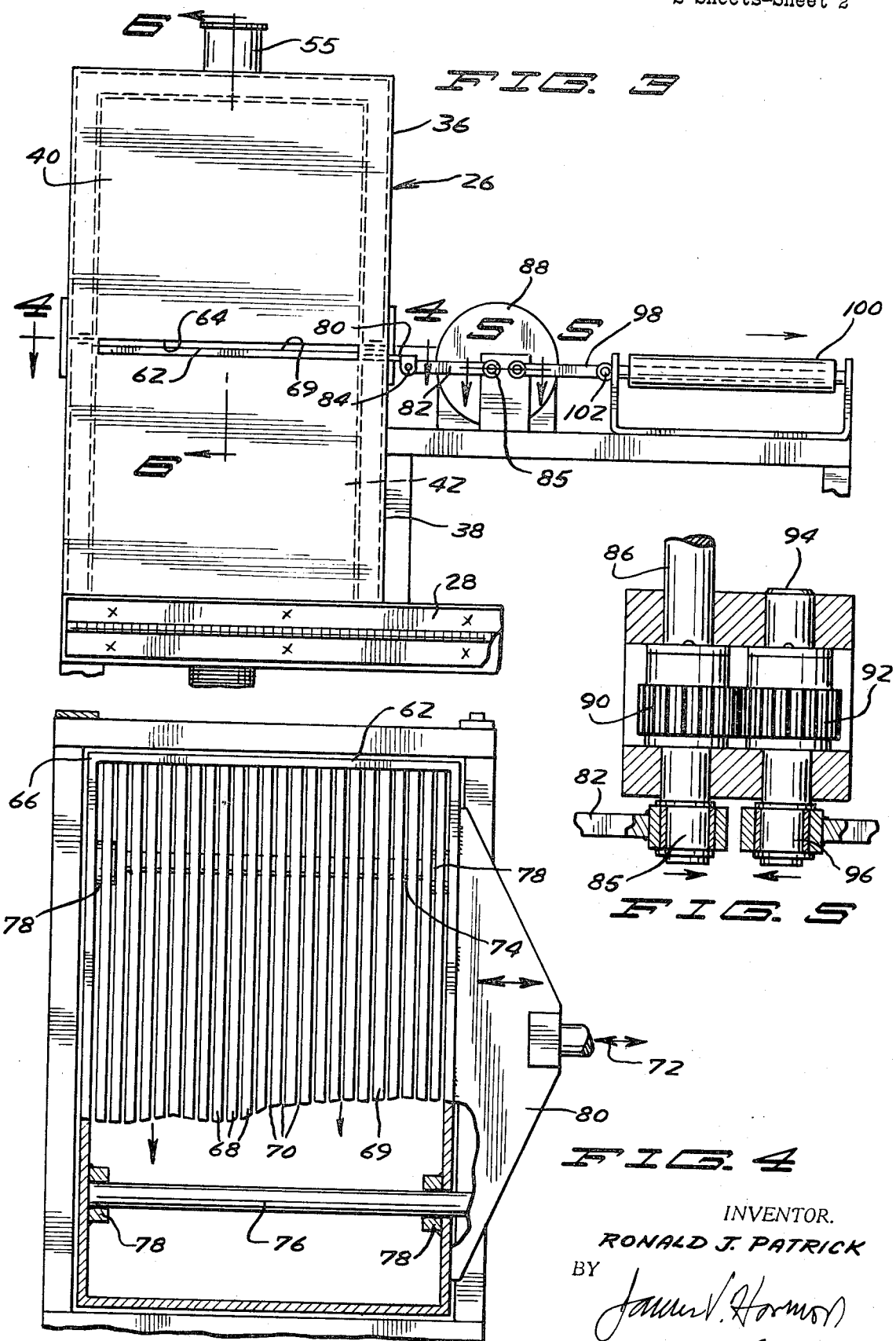

United States Patent Office 3,531,826
Patented Oct. 6, 1970

3,531,826
METHOD AND APPARATUS FOR AGGLOMERATING PULVERULENT MATERIALS
Ronald J. Patrick, Minneapolis, Minn., assignor to The Pillsbury Company, Minneapolis, Minn., a corporation of Delaware
Filed Aug. 24, 1967, Ser. No. 663,135
Int. Cl. B29j 1/100
U.S. Cl. 18—1                                   3 Claims

ABSTRACT OF THE DISCLOSURE

Method and apparatus for agglomerating (forming porous clusters) of powdered materials consisting of providing a porous supporting surface, e.g. parallel bars positioned in a plane inclined at an angle sufficient to cause the particles to flow across the surface at a predetermined speed. Vibratory movement is imparted to the supporting surface within the plane of the supporting surface so as to maintain the particulate material above the supporting surface in a state of turbulence. An agglomerating atmosphere ordinarily composed of a mixture of heated air and steam is forced upwardly through the screen to produce adhesive films on the particles which causes them to adhere to one another. The process is characterized by the ability to form agglomerates of a more uniform and easily controlled size than prior equipment.

---

The present invention relates to a method and apparatus for treating pulverulent materials and more particularly to a method and apparatus for forming particulate material into porous clusters or agglomerates.

In one form of particle agglomerating apparatus presently available, the particles are exposed to an agglomerating atmosphere such as steam when in a free-fall condition. This system has certain pronounced shortcomings, among them being the small size of the agglomerates and an inability to produce agglomerates of a uniform size.

In the type of agglomerating apparatus described in Pat. No. 2,995,773, particulate material that is to be agglomerated is placed on a porous horizontally disposed surface which vibrates along an inclined axis that has a motion component in the direction of travel of the particles to assist the particles in travelling through the apparatus. An agglomerating atmosphere such as a mixture of steam and air is forced upwardly through the screen and the bed of agitated particles supported on the screen. Although agglomerators of this type have proved highly successful for a variety of products, they have certain deficiencies (such as the adhesion of particulate material to the porous supporting surface) when used with certain products that either prevent their adoption or severely restrict the characteristics of the finished product. It was found that these limitations are due in large part to the fact that for one-half of a cycle of each vibration of the screen, the force applied to the particles by the screen opposes the weight of the particles on the screen and the applied force is greater than the weight of the particles. On the basis of information presently available, it appears that it is the repeated impact of the screen against the particles which is to a great extent responsible for the adhesion of the particles to the screen.

Another deficiency of the patented apparatus is that certain products cannot be formed into agglomerates of any selected size, the particle size being determined largely by the character of the material as it is fed to the agglomerator. It was also found that the direct impact of the screen upon the material being processed makes it difficult to control the speed of the material through the apparatus. To the extent that the speed of the material through the apparatus can be controlled, it cannot be regulated beyond relatively narrow limits. If long treatment times are desired, the size of the apparatus must be made substantially larger which is, of course, undesirable.

In view of these and other deficiencies of the prior art, the present invention has among its objectives to provide an agglomerating apparatus and process having the following characteristics and advantages: (a) the ability to produce agglomerates of a relatively uniform size; (b) the ability to produce agglomerates of a controlled and selected size which can be varied through a wide range of sizes as product specifications require; (c) the ability to process a variety of pulverulent materials without fouling the supporting screen; (d) the ability to control the hardness, solubility and density of the finished agglomerates: (e) the ability to control the speed of the particles through the apparatus over a relatively wide range; (f) the ability to operate the apparatus successfully at higher levels of moisture than could be tolerated with prior equipment; (g) the ability to control the wettability of finished agglomerates over a wide range of values; (h) the ability to provide a more compact apparatus than previously available thereby reducing construction and installation costs.

These and other more detailed and specific objects will be apparent in view of the following specification and drawings, wherein:

FIG. 1 is a side elevational view of the agglomerator in accordance with the invention and dryer located to receive the agglomerated particles.

FIG. 2 is a side elevational view of the agglomerator of FIG. 1 on an enlarged scale.

FIG. 3 is a vertical sectional view taken on line 3—3 of FIG. 2;

FIG. 4 is a horizontal sectional view taken on line 4—4 of FIG. 3.

FIG. 5 is a horizontal sectional view taken on line 5—5 of FIG. 3 on an enlarged scale.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

The process employed for carrying out the invention will now be described. In accordance with the process a supporting surface is provided. The supporting surface can be flat or curved but flat surfaces are preferred. If curved, it should have smooth contours. The surface is also preferably but not necessarily foraminous, i.e. containing openings. The supporting surface is placed in a plane which is inclined at a sufficiently steep angle relative to the horizontal so that the particulate material will flow across the supporting surface at a speed that will enable the particles to become bonded to each other during the time they are on the supporting surface. If the angle is too steep, insufficient bonding will occur and if too flat, there is a tendency for large sheets to form. It has been found than angles of from about 5–15° and preferably from about 8–12° will produce satisfactory results in one apparatus embodying the invention. Vibratory movement is imparted to the supporting surface within the plane of the supporting surface itself and if the supporting surface is curved, for example cylindrical, the vibration can occur in a plane parallel to the axis of the cylinder. The vibratory movement imparted to the supporting surface should maintain the particulate material above the surface in a state of turbulence and establish the general width and thickness of the bed.

The particulate material in the bed is continuously exposed to an agglomerating atmosphere, preferably by forcing an agglomerating atmosphere upwardly through the supporting surface and bed. As the particles are exposed to the agglomerating atmosphere, adhesive films are established on the particles in the bed causing the particles to adhere together at their points of contact to form porous clusters.

In FIG. 1 is shown an agglomerator 10 in accordance with the invention and a dryer 12 for the finished agglomerate. Particles are introduced to the agglomerator 10 through an inlet duct 14. The agglomerates flow from an outlet duct 16 to the inlet 18 of the dryer 12. The dryer 12 can comprise any commercially available dryer of known construction such as a hot air dryer having a horizontally disposed screen for supporting the agglomerates as they travel through the apparatus.

The agglomerator 10 consists of a supporting framework 20 composed of vertical members 22 which are connected together by horizontal bars 24 to which the hollow insulated agglomerator housing 26 is secured by means of a hinge 28.

As best seen in FIG. 2 the angle of the inclination of the housing 26 and all of its associated parts is controlled by a positioning means such as a screw 32 connected at its upper end to a frame member 26a of the housing 26 and at its lower end to one of the vertical members 22 of the framework 20. If, during operation, the housing 26 is inclined at a steeper angle the particles that are to be agglomerated will flow through it more rapidly. If its angle of inclination is decreased, the particles will pass through it more slowly.

The housing 26 consists of a hollow upper portion 36 which can be removed for cleaning and a lower portion 38. A sheet metal chute 37 is connected to the side of the agglomerator to receive the pulverulent material from the duct 14 and feed it into the agglomerator above the supporting screen which will be described below. The upper portion consists of four side walls and a top wall, each of which contains an insulating material to define an agglomerating chamber 40. The lower portion 38 of the housing 26 includes four side walls and a bottom wall which are also insulated to define an agglomerating atmosphere inlet plenum 42.

The equipment employed for supplying agglomerating atmosphere to the agglomerator will now be described. The agglomerating atmosphere is introduced to the plenum 42 through a flexible and extensible hose 44 connected to a heater 46. Air is supplied to the heater by means of a blower 48. The flow rate of the agglomerating atmosphere from the blower 48 to the heater 46 and thence to the agglomerator 10 is controlled by a valve 50 (FIG. 1). Heat is supplied to the heater 46 in any convenient manner as for example by means of a steam coil 52. Moisture is introduced to the agglomerating atmosphere in any convenient manner as by means of a steam line 54. Gases passing from plenum 42 to the agglomerating chamber 40 are exhausted through an outlet duct 55 and are preferably conveyed to an air cleaner.

The characteristics of the agglomerating atmosphere are continuously sensed during operation by means of a wet bulb thermometer 56 and a dry bulb thermometer 58 (FIG. 2). The wet bulb thermometer 56 is connected through suitable commercially available controls to the steam supply line 54 and the dry bulb thermometer 58 is suitably connected to similar controls for regulating the amount of heat supplied by the coil 52. In this way the agglomerating atmosphere is provided with the selected temperature and humidity.

As seen in FIG. 2 the chute 37 communicates with an inlet opening 60 that extends the full width of the upper portion of the agglomerator housing 26. During operation particles pass from the chute 37 through the opening 60 and onto a foraminous supporting surface or screen 62. Particles after passing over the screen 62 flow into the duct 16 and are exhausted through outlet opening 64.

The agglomerator screen and associated parts will now be described with particular reference to FIGS. 2, 3, 4 and 5.

The agglomerator screen 62 consists of a rectangular framework 66 to which is rigidly connected a plurality of parallel bars 68 having flat upper surfaces all positioned in the same plane 69. Bars 68 are spaced apart to define a plurality of gas inlet openings 70 through which the agglomerating gas is introduced from the plenum 42. The entire screen 62 is mounted for lateral sliding movement along an axis designated 72 in FIG. 4 by the provision of a pair of longitudinally spaced laterally extending parallel slide rods 74 and 76 which are rigidly secured at their ends to the lower portion 38 of the housing 26. The screen 62 is provided with a plurality of identical bushings 78 which are bored appropriately to slide freely on the rods 76. It will thus be seen that the slide rods 74 and 76 confine the oscillation of the screen 62 to a plane which is parallel to its upper surface 69. The screen drive and counterbalancing mechanism will now be described.

Connected rigidly to the framework 66 of the screen 62 is a tongue 80 to which a link 82 is connected by means of a pivot 84 (FIG. 3). The opposite end of the link 82 is secured to an eccentric 85 which is secured rigidly to a rotating shaft 86. Shaft 86 is rotated during operation by means of a motor 88 or other suitable drive means. The motor 88 is coupled as best seen in FIG. 5 by means of a pair of mating spur gears 90 and 92 to a shaft 94 to which is affixed an eccentric 96. The eccentric 96 is coupled to the end of a link 98, the other end of which is secured to a counterweight 100 by means of a pivot 102 (FIG. 3). The centers of the eccentrics 85 and 96 are positioned 180° out of phase and the counterweight 100 has a mass that equals that of the screen 62. During operation, the motor 88 will cause the screen 62 and the counterweight 100 to oscillate in opposite directions at the same frequency. In this way the motion of the counterweight will counterbalance the vibration of screen 62.

The motion of the screen 62 is confined to a plane parallel to its upper surface 69. The oscillation of the screen is along an axis when it is oriented at right angles to the direction of material of flow, i.e. from the top to the bottom of the figure as seen in FIG. 4.

The screen 62 can, in the alternative, consist of a sintered metal screen or other suitable screen material. When slots or directional openings are employed, it is preferred that the slot or openings extend at right angles to the direction of the vibration of the screen. The direction of vibration is not considered critical provided it is wholly or substantially in the plane of the surface 69. Thus, the axis to vibration can, if desired, be the same as the axis of the material flow. The vibration of the screen, moreover, can be elliptical or circular as well as rectilinear, if desired, provided it is substantially in the plane of the screen.

To operate the apparatus, the flow of vapor gas is started and the screen is inclined at an angle of about 30° relative to the horizontal. The upward flow of agglomerating atmosphere through the screen is preferably sufficient to fluidize the particles within the bed, i.e. suspend them uniformly in the agglomerating atmosphere. The motor 88 is then started. The material that is to be agglomerated is then introduced as a continuous stream. The angle of inclination of the screen is then decreased until the material passing through the apparatus has the desired characteristics. Operation is conventionally started with a medium wet bulb temperature and a relatively high angle of screen inclination so that the particles will pass through the apparatus at a relatively rapid rate. If the particles are relatively non-adhesive, more moisture may be required or the time passage through the agglomerator may be increased to provide complete agglomeration. This can be accomplished by decreasing the slope of the screen or by increasing the wet bulb temperature of the agglomerating atmosphere so as to increase the total moisture content of the product and thereby produce a greater degree of agglomeration. On the other hand, if the screen angle is too low or the moisture content of the agglomerating atmosphere is too high there may be a tendency for the finished agglomerates to become either too hard or too large in size or both. To obtain particles of relatively small size, the screen angle should be increased and the wet bulb temperature of the agglomerating atmosphere should be reduced. To obtain larger particles, the slope should be reduced and a higher wet bulb temperature should be maintained.

During operation, the particle size of the finished agglomerates is determined largely by adjusting the stroke length of the vibrating screen together with the angle of inclination of the screen relative to the horizontal. In summary, the angle of the screen is ordinarily increased until the selected speed of travel through the apparatus is achieved. The flow of agglomerating atmosphere through the screen is then increased until agglomerates of the proper character are obtained. The angle of inclination of the screen is then reduced until the proper agglomerating time is obtained.

During operation, a boundary or interface exists between the relatively stationary bed of particles, and the moving screen. When particles adhere to the screen the interface can be thought of as travelling or moving upwardly in a vertical direction. It is desirable, of course, to maintain the boundary layer as close to the screen surface as possible by preventing adhesion between the particles and the screen. To understand the principle of operation, a single particle positioned slightly above the screen which is inclined at angle $\theta$ can be considered. The weight of the particle acting vertically will have two force components, one normal to the screen and the other parallel to the screen. A frictional force will act in a direction opposing the latter. The supporting force provided by the screen will act in a direction opposing the former. The gravitational force tending to move the particle over the screen can be represented as follows:

$$WX \sin \theta$$

wherein W equals weight and $\theta$ equals the slope of the screen.

The force opposing the motion of the patricle when the screen is stationary is $$u_s W \cos \theta$$

wherein $u_s$ equals static coefficient to friction. When the screen is in motion, the force opposing the motion of the particles equals:

$$uW \cos \theta$$

wherein $u$ equals the dynamic coefficient of friction.

Since $u$ is much smaller than $u_s$, it is important to achieve dynamic friction rather than static friction. This is accomplished in accordance with the invention by maintaining the screen under constant vibratory movement in the plane of its own surface. Since there is no force or motion component of the screen either toward or away from the particles, the vibratory movement of the screen will not cause collisions between the particles themselves and the screen and with no impact between the particles and the screen adhesion of the particles to the screen is minimized.

The vibration imparted to the screen according to the present invention has nothing to do with moving the product through the apparatus. Vibration direction is entirely in the plane of the screen and gravity alone is used to propel the particles through the apparatus.

In a typical application of the present invention, the peak velocity of the screen undergoing reciprocal vibration is about 10–30 inches per second with 22 inches per second being typical whereas the typical particle velocity travelling over the screen is from 4–10 inches per second in a direction transverse to the direction of vibration. In one installation the particles had a velocity of 300 feet per minute across the screen. The screen had an area of 20 inches x 18 inches and the flow rate of agglomerating atmosphere through the screen was 750 cubic feet per minute. The agglomerating atmosphere can have the same consistency as employed in U.S. Pat. No. 2,995,773.

A suction fan (not shown) is preferably used on the outlet of the agglomerator to maintain a slight negative pressure within the agglomerator to prevent escape of product from the agglomerator.

The invention proved to be highly effective during its initial evaluation. As in all agglomerators of the general class described, the longer the particles were allowed to remain in the apparatus the more moisture they absorb. When the particles became relatively tacky, the frictional contact between the particles and the supporting screen as judged by the operator increases and the tendency for the particles to adhere to the screen also increases. In previous machines only relatively small amounts of energy were provided to remove the particles from the supporting screen. With the present invention, however, the oscillation of the screen was found highly effective in preventing undesired adhesion of particulate material to the screen. Even after the agglomerates achieved a plastic condition, little adhesion was noted.

It was found that with the present invention it is possible to produce relatively strong agglomerates which are highly resistant to breakage during shipment primarily because processing times can be increased without a proportional increase in the tendency for the particles to adhere to the screen. Moreover, when wettability is an important quality of the finished product, a high degree of wettability can be achieved because the time of exposure to the agglomerating atmosphere can be readily controlled.

In one apparatus embodying the invention, a screen frequency of about 1800 to 3600 cycles per minute with stroke of about $\frac{1}{32}$–$\frac{3}{32}$ inch was satisfactory to keep the material in an agitated and aerated condition with very little adhesion of particles to the agglomerating apparatus. It was also found that a screen angle of approximately 10° causes the particles to travel at about 8–10 feet per minute through the apparatus.

The invention will be better understood by reference to the following examples.

In each of the examples presented below the temperature and humidity of the air supply is first set at a predetermined level. The air flow is then adjusted to approximately 150 feet per minute and the apparatus is allowed to reach an equilibrium temperature and humidity. Next, the motor 88 is started to initiate vibration of the screen 62. The screen is then elevated to its maximum angle of inclination. A small sample is then allowed to pass through the apparatus and checked for the desired physical properties. If only a slight effect is obtained, the humidity of the agglomerated atmosphere is increased. Conversely, if too much agglomerating effect is achieved the humidity is reduced. When the proper degree of agglomeration is achieved, the product run may commence. The following material was agglomerated using the conditions described in Runs 1, 2 and 3 as set forth below.

EXAMPLE I

An artificially sweetened imitation drink mix containing citric acid, calcium cyclamate, sodium citrate, calcium saccharin and artificial coloring and flavoring.

Run No. 1

R.p.m.—2400. Stroke—$\frac{1}{16}$".
Angle—30°. Wet bulb temperature 160° F. Dry bulb temperature 250° F.
Particles hard and uniform. The water soluble dye was thoroughly dispersed to give very bright color. The density was 21 lb./ft.$^3$.

Run No. 2

R.p.m.—2400. Stroke—1/16".
Angle—20°. Wet bulb temperature 150° F. Dry bulb temperature 250° F.
Particles were uniform and hard with a density of 22 lb./ft.³. Good solubility.

Run No. 3

R.p.m.—2400. Stroke—1/16".
Angle—10°. Wet bulb temperature 150° F. Dry bulb temperature 250° F.
Particles were uniform and very hard with a density of 24 lb./ft.³.
Good solubility.

EXAMPLE II

Sugar (sucrose) was ground on a hammer mill through a 0.13" Herring Bone Screen. The material was then agglomerated to a uniform size. The density was approximately 22 lb./ft.³.

Run No. 1

R.p.m.—2400. Stroke—1/16".
Angle—15°. Wet bulb temperature 170° F. Dry bulb temperature 125° F.

EXAMPLE III

A high bloom gelatin sized through an 80 mesh sieve was agglomerated as described in Example II. Compounded with the gelatin was sugar, citric acid, flavor and color. With a content of almost 50% gelatin, the resulting agglomerates were uniform, hard, and cold water soluble and setting. The motor was run at a speed of 2400 r.p.m. The stroke length of the vibrating screen was 1/16". The screen was inclined at an angle of 15° to the horizontal.

It is apparent that many modification and variations of this invention as hereinbefore set forth may be made without departing from the spirit and scope thereof. The specific embodiments described are given by way of example only and the invention is limited only by the terms of the appended claims.

I claim:

1. An agglomerating apparatus comprising a foraminous supporting surface including a plurality of parallel bars having spaces therebetween through which the agglomerating gas is forced upwardly through the bed, elongated openings defined by the spaced bars being oriented parallel to the direction of travel of the particulate material through the apparatus, means for supplying a particulate material to be agglomerated to the top of the supporting surface to thereby define a particle bed on the supporting surface, a mounting means connected to the supporting surface for restricting the movement of the supporting surface within a plane substantially parallel to the supporting surface, means for supplying an atmosphere to the bed adapted to agglomerate said material by causing the particles in the bed to become bonded together at their points of contact and a drive means operatively connected to the foraminous supporting surface to impart continuous vibratory movement to the surface in said plane to agitate the particles in the bed as they travel through said apparatus.

2. An agglomerating apparatus comprising a foraminous supporting surface, means for supplying a particulate material to be agglomerated to the top of the supporting surface to thereby define a particle bed on the supporting surface, a mounting means connected to the supporting surface for restricting the movement of the supporting surface within a plane substantially parallel to the supporting surface, a means for supplying an atmosphere to the bed adapted to agglomerate said material by causing the particles in the bed to become bonded together at their points of contact comprising a hollow housing having an agglomerating chamber above the supporting surface and a plenum chamber positioned below the supporting surface, duct means communicatively connected to the plenum chamber for introducing said atmosphere thereto, a blower connected to the duct forcing said atmosphere into the plenum, heater means provided in communication with the plenum to heat said atmosphere before it enters the plenum, means for adding moisture to the heated atmosphere and a drive means operatively connected to the foraminous supporting surface to impart continuous vibratory movement to the surface in said plane to agitate the particles in the bed as they travel through said apparatus.

3. An agglomerating apparatus comprising a foraminous supporting surface, means for supplying a particulate material to be agglomerated to the top of the supporting surface to thereby define a particle bed on the supporting surface, a mounting means connected to the supporting surface for restricting the movement of the supporting surface within a plane substantially parallel to the supporting surface, means for supplying an atmosphere to the bed adapted to agglomerate said material by causing the particles in the bed to become bonded together at their points of contact, a psychrometer mounted upon said apparatus in communication with the atmosphere supply, said psychrometer being operatively associated with a heater and a means for adding moisture to said atmosphere to regulate the temperature and moisture content thereof and a drive means operatively connected to the foraminous supporting surface to impart continuous vibratory movement to the surface in said plane to agitate the particles in the bed as they travel through said apparatus.

References Cited

UNITED STATES PATENTS

| | | | |
|---|---|---|---|
| 2,304,382 | 12/1942 | Shoeld | 18—1 |
| 2,461,089 | 2/1949 | Smidt. | |
| 2,553,714 | 5/1951 | Lucas. | |
| 2,696,019 | 12/1954 | Allen et al. | 18—1 |
| 3,083,411 | 2/1963 | Glass | 18—1 |
| 3,142,862 | 8/1964 | Guldman | 18—1 |
| 3,171,159 | 3/1965 | Cunder et al. | 18—1 |
| 3,390,647 | 7/1968 | Evans | 18—1 |

J. SPENCER OVERHOLSER, Primary Examiner